(12) United States Patent
Jeltsch et al.

(10) Patent No.: US 8,556,604 B2
(45) Date of Patent: Oct. 15, 2013

(54) ECCENTRIC SCREW PUMP FOR MORTAR

(75) Inventors: Thomas Jeltsch, Friedrichshafen (DE); Thorsten Schnittger, Markdorf (DE)

(73) Assignee: J. Wagner GmbH, Markdorf (DE)

( * ) Notice: Subject to any disclaimer, the term of this patent is extended or adjusted under 35 U.S.C. 154(b) by 263 days.

(21) Appl. No.: 12/913,826

(22) Filed: Oct. 28, 2010

(65) Prior Publication Data

US 2011/0103972 A1    May 5, 2011

(30) Foreign Application Priority Data

Oct. 30, 2009  (DE) ..................... 20 2009 014 663 U

(51) Int. Cl.
   *F01C 1/10*     (2006.01)
(52) U.S. Cl.
   USPC ................................ 418/48; 418/70; 166/85.1
(58) Field of Classification Search
   USPC ............... 417/44.1; 418/48, 49, 70; 166/68.5, 166/85.1, 105; 175/217
   See application file for complete search history.

(56) References Cited

U.S. PATENT DOCUMENTS

| 2,737,119 | A | * | 3/1956 | Hill ................................. 417/326 |
| 3,354,537 | A | | 11/1967 | O'Connor |
| 4,140,444 | A | | 2/1979 | Allen |
| 6,045,333 | A | * | 4/2000 | Breit ............................. 417/44.1 |
| 6,622,381 | B2 | * | 9/2003 | Amburgey ............... 29/888.021 |
| 2003/0103856 | A1 | | 6/2003 | Amburgey |
| 2009/0136371 | A1 | | 5/2009 | Gerling |

FOREIGN PATENT DOCUMENTS

| DE | 103 37 382 A1 | 3/2005 |
| EP | 1 887 223 A1 | 2/2008 |
| EP | 1 914 426 A1 | 4/2008 |

OTHER PUBLICATIONS

Extended European Search Report dated Feb. 18, 2013.

* cited by examiner

Primary Examiner — Charles Freay
Assistant Examiner — Patrick Hamo
(74) Attorney, Agent, or Firm — Burr & Brown

(57) ABSTRACT

An apparatus for delivering a viscous material by means of an eccentric screw pump, includes a framework for carrying and fastening apparatus elements, a pump-housing portion for carrying a stator and a rotor in the form of a delivery screw, suction and pressure regions for introducing and discharging the delivery material, respectively, an electric drive unit for driving the rotor in the stator in a first direction of rotation for delivering the delivery material, a control mechanism for activating the drive unit, and one or more releasable retaining members for the rotationally fixed and/or positionally fixed connection of the drive unit and of the stator. A change in the direction of rotation to a second direction of rotation of the electric drive unit, with the retaining mechanism released, gives rise to automatic separation of the pump-housing portion with the stator by virtue of the rotor being unscrewed.

10 Claims, 6 Drawing Sheets

ECCENTRIC SCREW PUMP FOR MORTAR

This application claims the benefit under 35 USC §119(a)-(d) of German Application No. 20 2009 014 663.4 having filing date of Oct. 30, 2009, the entirety of which is incorporated herein by reference.

FIELD OF THE INVENTION

The invention relates to an apparatus for delivering viscous delivery material.

BACKGROUND OF THE INVENTION

Mortar pumps with eccentric screws are known from the prior art. In some cases, they are designed as submersible pumps which project into a storage vessel by way of a suction end, suck the delivery material out of this storage vessel and deliver it, via a discharge line, to the processing location, in particular to mortar-spray equipment. Also known are horizontal mortar pumps which use an eccentric screw to remove mortar out of a storage vessel via a suction-intake region and transport the same into a pressure region for processing under pressure.

The cleaning of the eccentric screw pump is problematic in the case of the known apparatuses according to the prior art. It is necessary here for the rotor, which constitutes the screw, to be separated from the stator, in which the screw runs. However, since the pump action results from elastically sealing deformation of the stator as the screw rotates through the same, this stator provides a considerable level of resistance, during dismantling, through the screw simply being pulled out. The prior art, for example, DE 103 37 382 A1, discloses means which overcome this resistance. However, these means are expensive and have to be arranged separately, using additional operating steps, on the apparatus which is to be cleaned.

SUMMARY OF THE INVENTION

The object of the invention then, is to simplify the dismantling of a corresponding apparatus with eccentric screw pump.

The invention relates to an apparatus for delivering viscous delivery material, for example mortar, by means of an eccentric screw pump. The apparatus comprises a framework for carrying and fastening apparatus elements, a pump-housing portion for carrying a stator and a rotor, which is mounted for rotation in the stator and is in the form of a delivery screw, a suction region for introducing the delivery material, a pressure region for discharging the delivery material, an electric drive unit for driving the rotor in the stator in a first direction of rotation for delivering the delivery material, a control means for activating the drive unit, and one or more releasable retaining means for the rotationally fixed and/or positionally fixed connection of the drive unit and of the stator. As a result of the invention, a change in the direction of rotation of the electric drive unit to a second direction of rotation, with the retaining means released, gives rise to automatic separation of the pump-housing portion with the stator by virtue of the rotor being unscrewed.

The drive unit can be understood, according to the invention, as being a combination of a motor with a gear mechanism and corresponding shafts and bearings. However, it is also conceivable to have drive units which act directly on the rotor via a direct drive with sufficient torque, along with the necessary low speed of rotation.

Releasing the position-fixing retaining means, when rotation-fixing retaining means are provided, allows the eccentric screw to be unscrewed from the stator on account of the interengaging geometries. This is realized, in particular, by the retaining means according to the invention and the possible reversal in the direction of rotation of the drive unit, without any need for belt drives or control mechanisms which are especially complex, and thus susceptible to malfunctioning.

In an advantageous development of the invention, this is characterized by the arrangement, on the pump-housing portion, of two radially outwardly directed bolts which guide the pump-housing portion linearly, during the separating operation, in guide means on the framework and/or in a housing sleeve and/or a further housing portion and/or a motor housing.

These bolts form the rotation-fixing retaining means, and they can be used, in addition, as a means for carrying threaded pins which, in a mounted position, as position-fixing retaining means, together with corresponding cap nuts fasten the bolts, and thus the pump-housing portion, on the drive unit or the housing thereof.

In an advantageous development of the invention, this is characterized in that the rotor is supported on the stator, and preferably deforms the same elastically to a slight extent, during the operation of separating the pump housing.

This operation corresponds to the deformation which is conventional during delivery in an eccentric screw pump, wherein, during delivery, the force which counteracts the support has to be applied by the position-fixing retaining means.

In an advantageous development of the invention, this is characterized in that, with the retaining means fixed, the rotor, during operation, provides for suction operation or pressure operation, depending on the direction of rotation of the drive unit, as a result of which the suction region and pressure region are swapped over.

It is also possible using the pump according to the invention, prior to dismantling, for delivery material located in the system to be delivered back into the storage vessel and for the system thus to be emptied.

In an advantageous development of the invention, this is characterized in that the suction region is arranged at an angle of approximately 90° in relation to the rotor axis and comprises a preferably hopper-like vessel for carrying the viscous delivery material on the apparatus for pressure operation.

This allows the delivery material to be continuously replenished.

In an advantageous development of the invention, this is characterized in that the suction region is arranged in an extension in relation to the rotor axis and can preferably be submerged in a vessel for carrying the viscous delivery material.

This embodiment allows, inter alia, removal from a mixing vessel or a mixing trough.

In an advantageous development of the invention this is characterized in that the suction region is formed with connection means to a container with delivery material stored therein, preferably a disposable container.

Reusable containers containing industrially pre-fabricated delivery material, for example mortar or plaster, may be integrated in corresponding system programs and be provided with special connection means for system-compatible delivery equipment. Disposable containers, for example made of cardboard composite materials, are also conceivable.

In an advantageous development of the invention, this is characterized in that at least two successive shaft seals are provided between the drive unit and rotor, in an introduction region or suction region, for the purpose of sealing the introduction region in relation to the drive unit.

In particular when the suction region is located at the same shaft end of the rotor as the drive unit, optimum sealing is necessary. The eccentric screw generates, in the suction region, a negative pressure which, with insufficient sealing, could result in the ingress of secondary air, in which case air bubbles would be enclosed in the delivery material.

In an advantageous development of the invention, this is characterized in that the drive unit comprises a brushless direct-current motor and preferably a gear mechanism. In particular the utilization of the properties of brushless direct-current motors, for example, the high torque along with low speeds of rotation, renders possible the cost-effective construction which is not susceptible to malfunctioning and contamination. A reversal in the direction of rotation here is easy and cost-effective to realize, without any reductions in efficiency having to be accepted in the process.

BRIEF DESCRIPTION OF THE DRAWINGS

The invention will be explained briefly in more detail hereinbelow by way of the exemplary embodiments illustrated. However, the invention is not restricted to the examples. Rather, it covers all configurations which make use of the concept which is essential to the invention.

DETAILED DESCRIPTION OF THE INVENTION

Figure 1:
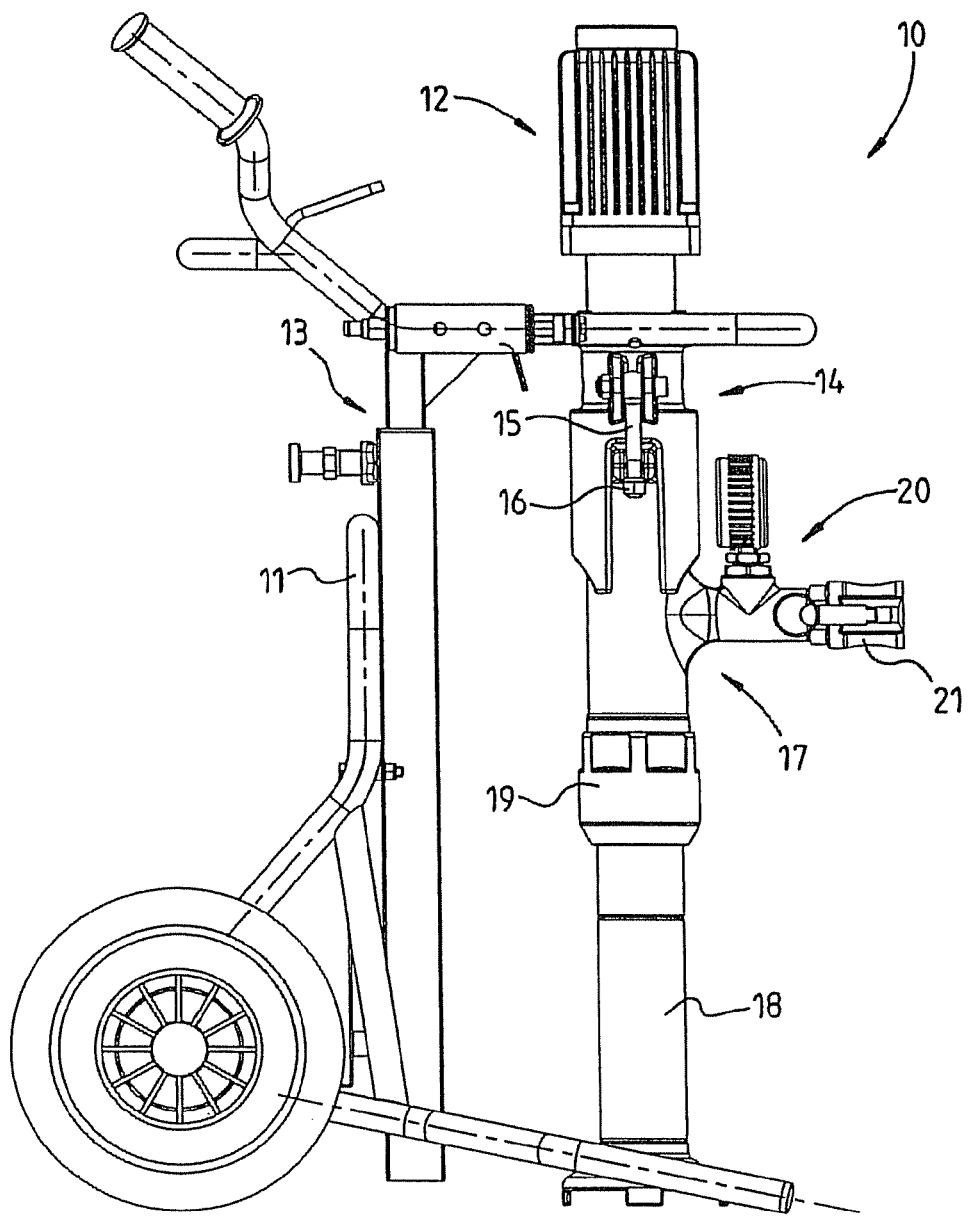
FIG. 1 shows a submersible mortar pump in the assembled state.

FIG. 1 shows, in detail, a submersible mortar pump 10. The pump comprises a framework 11, which has the drive unit 12 fastened at its upper end. The framework has a telescopic arrangement 13, which makes it easier for the pump to be introduced into a storage vessel (not illustrated here).

Pivotably mounted threaded bolts 15 are provided on an upper housing portion 14. The threaded bolts 15 form, along with cap nuts 16, a positionally fixed connection between the upper housing portion and the lower housing portion 17. The lower housing portion 17 bears, at its lower end, a suction extension 18, which is submerged into a vessel. The suction extension 18 is connected to the lower housing portion 17 via fastening means 19. The pressure region 20, with connection means 21 for a pressure line or an operating apparatus, is formed above the fastening means 19.

Figure 2:
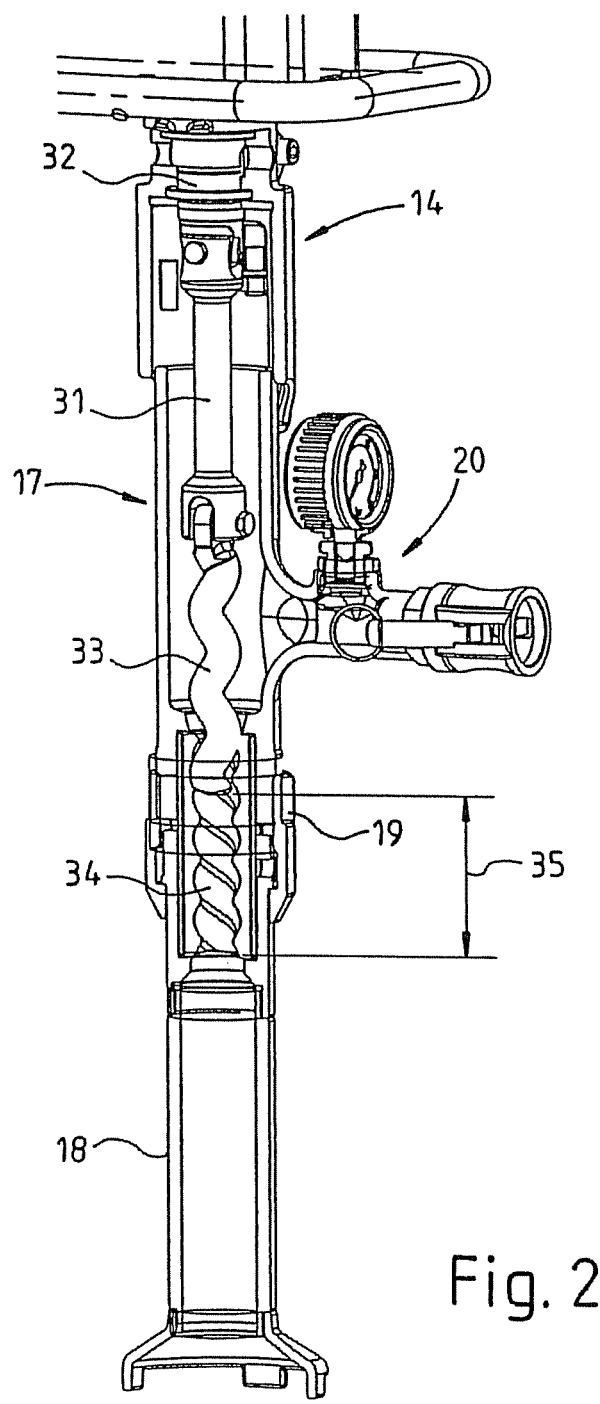
FIG. 2 shows a section through the eccentric screw.

FIG. 2 shows a cross section of the eccentric screw pump in a partially dismantled state. The driveshaft 31 of the drive unit 12 runs in the interior of the upper housing portion 14 and is connected to the eccentric screw 33 via coupling means 32. The eccentric screw 33 runs within the stator 34 and generates suction at the suction extension 18, for the purpose of delivering the material, in accordance with the principle of an eccentric screw pump. In the present illustration, the eccentric screw 33 has already been unscrewed from the stator by the distance 35, this having been achieved by the drive unit 12 being driven in the opposite direction of rotation to that used for the delivery operation. For this purpose, the retaining means have been released correspondingly.

Figure 3:
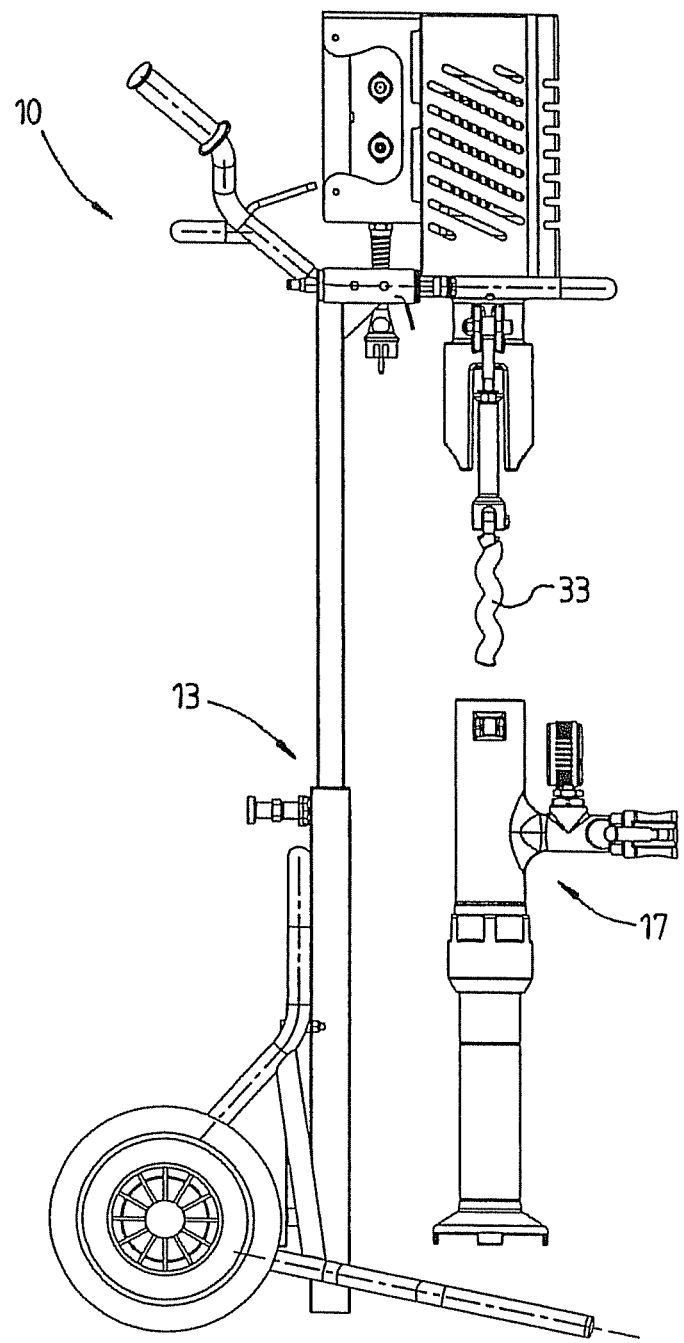
FIG. 3 shows a submersible mortar pump with the stator removed.

FIG. 3 shows an arrangement in which the lower housing portion 17 is completely separated from the rotor (eccentric screw 33). The telescopic arrangement 13 has been extended here.

Figure 4:
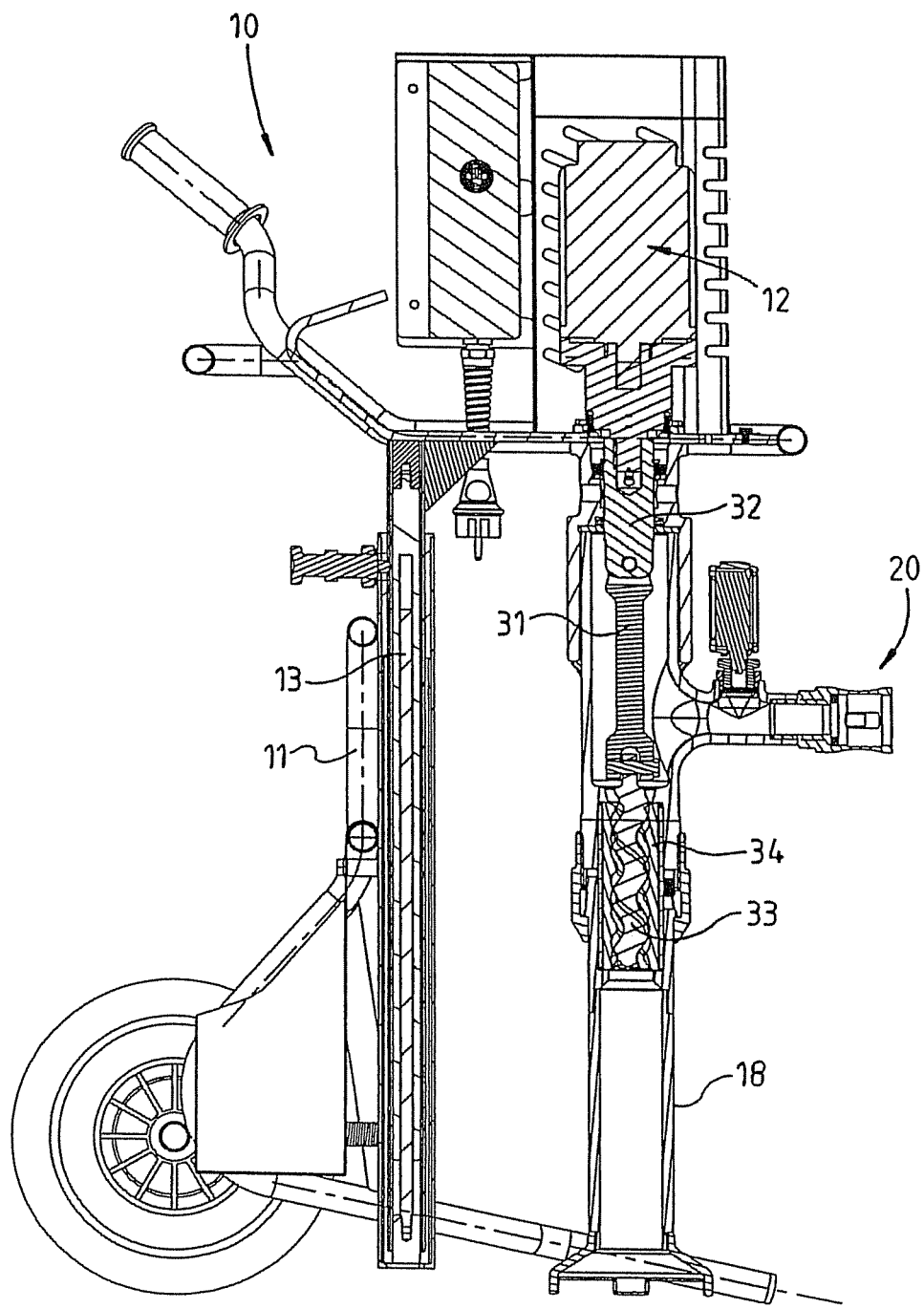
FIG. 4 shows a section through the submersible mortar pump.

FIG. 4 shows a further, more detailed illustration of the mortar pump according to the invention in cross section. The mortar pump here is illustrated in a fully assembled state.

Figure 5:
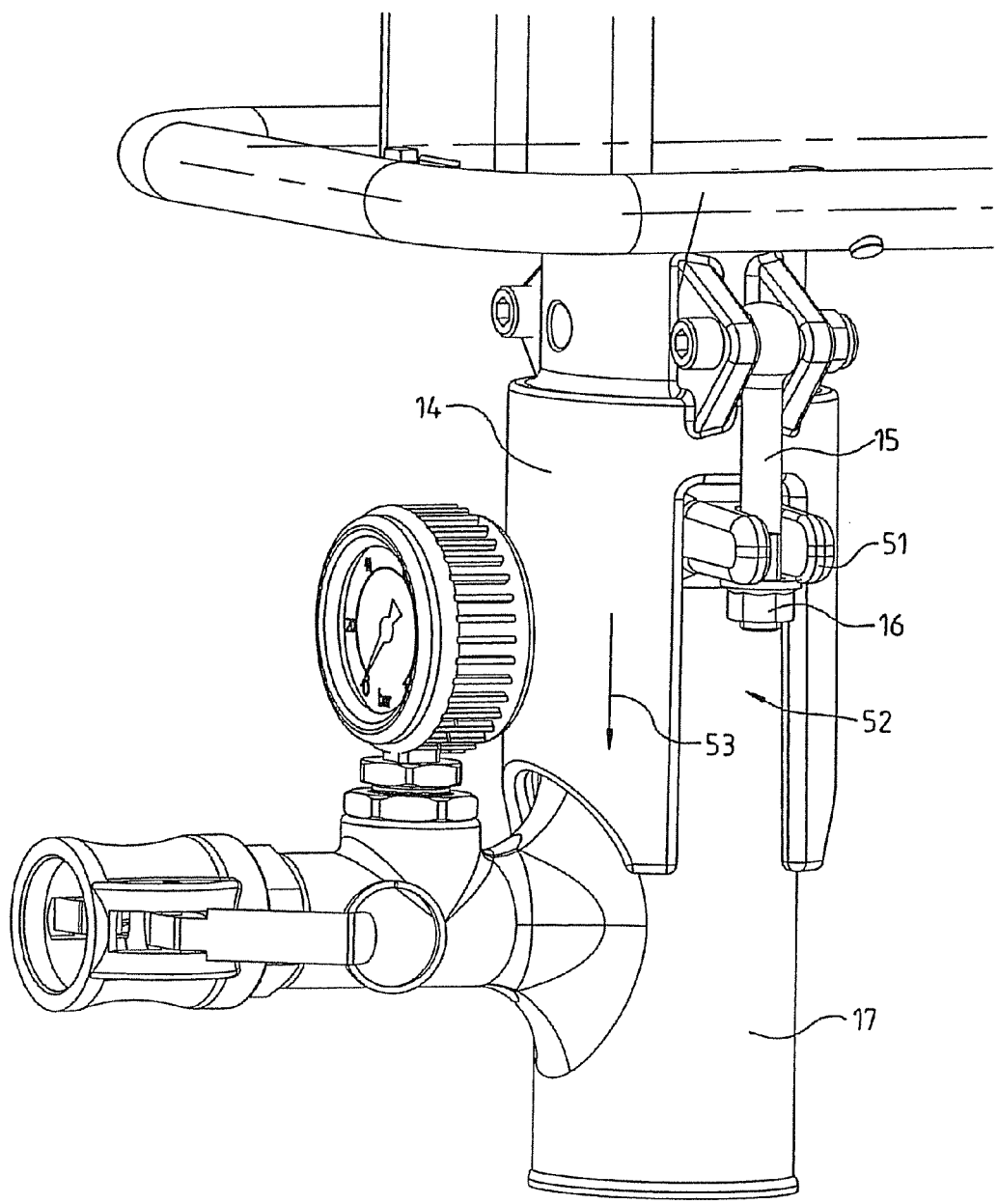
FIG. 5 shows a detailed illustration of the retaining means and of the pressure region.

FIG. 5 shows a more precise illustration of the retaining means according to the invention. The upper housing portion 14 is connected to the lower housing portion 17 via threaded bolts 15, which are fastened in a pivotable manner thereon. The threaded bolts 15 here engage through bolts 51 which are directed radially outwards from the lower housing portion 17 and run in a longitudinal slot 52 in the upper housing portion 14. The positionally fixed connection of the position-fixing retaining means of the threaded bolts 15 is made by cap nuts 16 which are fitted on the threaded bolts 15 and fix the bolts 51. Releasing the cap nuts 16, which are arranged symmetrically preferably on the two opposite sides of the mortar pump, allows the bolt 51 to be moved along the longitudinal slot 52. However, a rotary movement of the lower housing portion 17 in relation to the upper housing portion 14 is inhibited until the bolt has left the longitudinal slot 52 and this constitutes the rotation-fixing retaining means. The length of the slot 52 here corresponds approximately to the length of the eccentric screw 33, and therefore the latter can be unscrewed all the way out of the stator 34 without the lower housing portion 17 executing a rotary movement.

Figure 6:
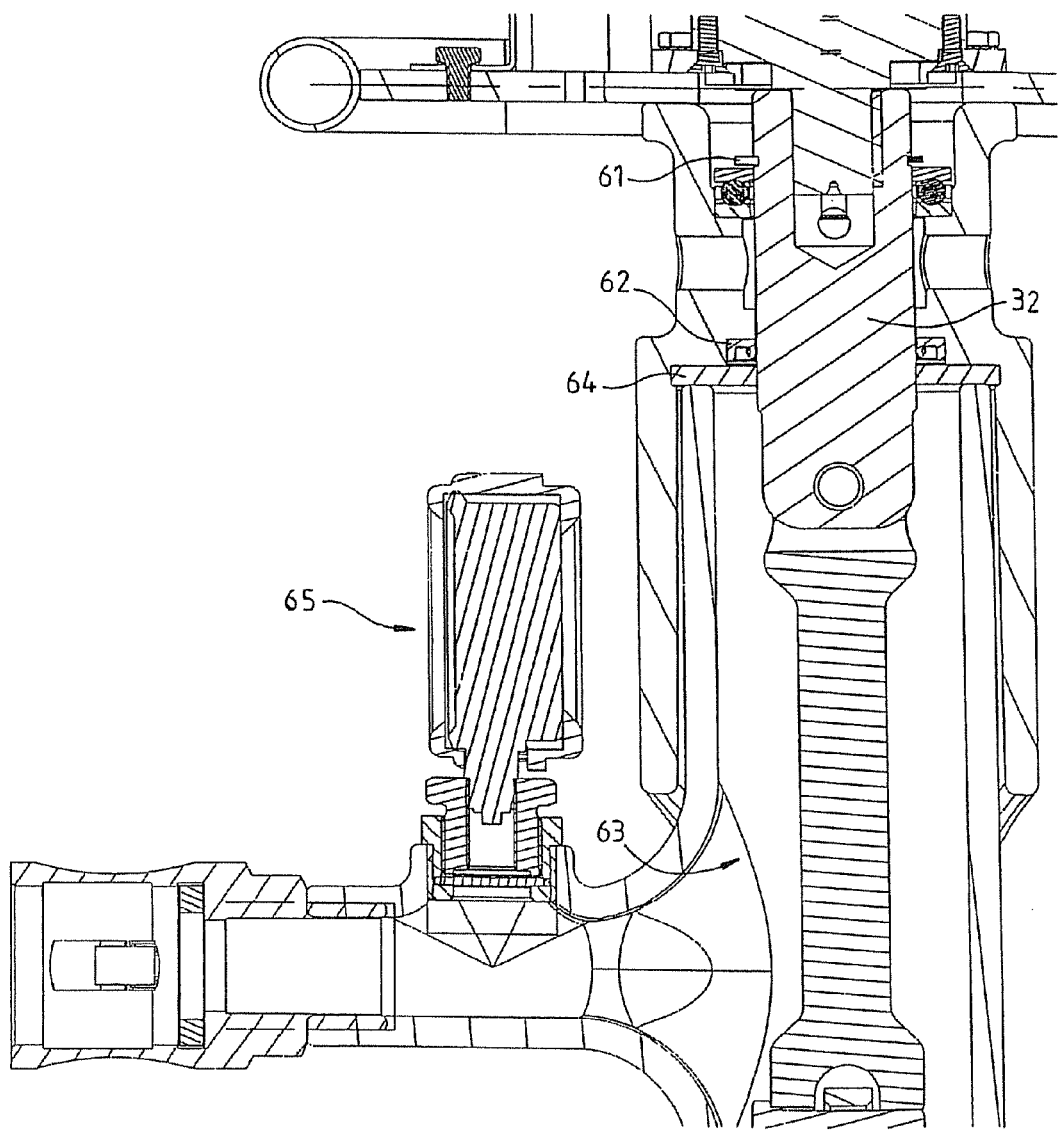
FIG. 6 shows a detailed illustration of the seals.

FIG. 6 shows an upper seal 61 and a lower seal 62, which seal the pressure region 63 in the interior of the pump in relation to the drive region and lead the driveshaft 31 through them. In addition, it is also possible to provide a coarser material seal 64. The pressure region has a monitoring manometer 65, which indicates the operating pressure reached.

LIST OF DESIGNATIONS

10 Submersible mortar pump
11 Framework
12 Drive unit
13 Telescopic arrangement
14 Housing portion
15 Threaded bolt
16 Cap nut
17 Housing portion
18 Suction extension
19 Fastening means
20 Pressure region
21 Connection means
31 Driveshaft
32 Coupling means
33 Eccentric screw
34 Stator
35 Distance
51 Bolt
52 Longitudinal slot
53 Distance
61 Seal
62 Lower seal
63 Pressure region
64 Material seal
65 Monitoring manometer

The invention claimed is:

1. An apparatus for delivering viscous delivery material using an eccentric screw pump, comprising:
 a framework for carrying and fastening apparatus elements;
 a pump-housing portion for carrying a stator and a rotor, which is mounted for rotation in the stator and is in the form of a delivery screw;
 a suction region for introducing the delivery material;
 a pressure region for discharging the delivery material;
 an electric drive unit for driving the rotor in the stator in a first direction of rotation for delivering the delivery material;
 a control mechanism for activating the drive unit;
 at least one releasable retaining member for at least one of a rotationally fixed connection and a positionally fixed connection between the drive unit and the stator;
 wherein a change in the direction of rotation to a second direction of rotation of the electric drive unit, with the retaining member released, gives rise to automatic separation of the pump-housing portion with the stator by virtue of the rotor being unscrewed.

2. An apparatus according to claim 1, further comprising on the pump-housing portion, two radially outwardly directed bolts which guide the pump-housing portion linearly, during the automatic separation operation, in guides that are located in at least one position selected from the framework, in a housing sleeve, on a further housing portion, and on a motor housing.

3. An apparatus according to claim 1, wherein the rotor is supported on the stator and deforms the stator elastically during separation of the pump housing portion.

4. An apparatus according to claim 1, wherein, with the retaining member fixed, the rotor, during operation, provides for suction operation or pressure operation, depending on the direction of rotation of the drive unit, as a result of which the suction region and pressure region are exchanged.

5. An apparatus according to claim 1, wherein the suction region is arranged at an angle of approximately 90° in relation to the rotor axis and comprises a hopper vessel for carrying the viscous delivery material on the apparatus for pressure operation.

6. An apparatus according to claim 1, wherein the suction region is arranged in an extension in relation to the rotor axis and is submersible in a vessel for carrying the viscous delivery material.

7. An apparatus according to claim 1, wherein the suction region comprises a connection mechanism for coupling to a container with delivery material stored therein.

8. An apparatus according to claim 1, further comprising at least two successive shaft seals between the drive unit and rotor, in an introduction region or suction region, to seal the introduction region in relation to the drive unit.

9. An apparatus according to claim 1, wherein the drive unit comprises a brushless direct-current motor and a gear mechanism.

10. An apparatus according to claim 1, wherein the at least one releasable retaining member provides a positionally fixed connection and a rotationally fixed connection between the drive unit and the stator.

* * * * *